(12) United States Patent
San Jose

(10) Patent No.: US 9,189,228 B2
(45) Date of Patent: Nov. 17, 2015

(54) SYSTEMS AND METHODS FOR DEVELOPING AND TESTING ELECTRONIC CONTENT USING MULTIPLE DEVICES

(75) Inventor: Jason A. San Jose, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 634 days.

(21) Appl. No.: 13/175,224

(22) Filed: Jul. 1, 2011

(65) Prior Publication Data

US 2014/0304689 A1    Oct. 9, 2014

(51) Int. Cl.
*G06F 9/44* (2006.01)

(52) U.S. Cl.
CPC ... *G06F 8/71* (2013.01); *G06F 8/30* (2013.01)

(58) Field of Classification Search
CPC .......................................................... G06F 8/30
USPC ................................................. 717/109, 113
See application file for complete search history.

(56) References Cited

U.S. PATENT DOCUMENTS

| 5,854,932 | A  | * | 12/1998 | Mariani et al. | 717/116 |
|---|---|---|---|---|---|
| 6,396,520 | B1 | * | 5/2002 | Ording | 715/798 |
| 7,487,279 | B2 | * | 2/2009 | Su | 710/200 |
| 7,490,167 | B2 |   | 2/2009 | Pena et al. | |
| 7,689,908 | B2 |   | 3/2010 | Yan et al. | |
| 8,044,931 | B2 | * | 10/2011 | Broussard | 345/156 |
| 8,161,465 | B2 | * | 4/2012 | Yang et al. | 717/140 |
| 2004/0024812 | A1 |   | 2/2004 | Park et al. | |
| 2006/0286536 | A1 | * | 12/2006 | Mohler et al. | 434/350 |
| 2007/0244906 | A1 | * | 10/2007 | Colton et al. | 707/10 |
| 2010/0153583 | A1 | * | 6/2010 | Harris et al. | 709/246 |
| 2010/0257457 | A1 | * | 10/2010 | De Goes | 715/751 |

FOREIGN PATENT DOCUMENTS

WO    WO2009/073583    6/2009

OTHER PUBLICATIONS

IBM, "Installing XL C/C++ compiler updates on Linux", Jan 28, 2008, http://www-01.ibm.com/support/docview.wss?uid=swg21215572.*

* cited by examiner

*Primary Examiner* — Wei Zhen
*Assistant Examiner* — Lanny Ung
(74) *Attorney, Agent, or Firm* — Kilpatrick Townsend & Stockton LLP

(57) ABSTRACT

One embodiment involves accessing, via a first computing device, electronic content being developed in a shared development environment, wherein the shared development environment comprises the first computing device and one or more other computing devices configured to provide access to the electronic content being developed in real time. The exemplary embodiment further involves receiving, at the first computing device, a modification to the electronic content that originated at one of the one or more other computing devices, providing, for display at the first computing device, the electronic content being developed with the modification, and executing, at the first computing device, the electronic content being developed with the modification.

20 Claims, 5 Drawing Sheets

SYSTEMS AND METHODS FOR DEVELOPING AND TESTING ELECTRONIC CONTENT USING MULTIPLE DEVICES

TECHNICAL FIELD

This disclosure relates generally to computer software and more particularly relates to the creation, testing, modification, use, and distribution of electronic content for use on computing devices.

BACKGROUND

The term "electronic content" refers to any type of media that can be displayed on mobile and other computing devices. Computing devices include devices such as desktop computers, laptop computers, smart phones, tablet computers, personal digital assistants, etc. Electronic content can include text or multimedia hosted on websites, such as standard web pages or mobile web pages specifically formatted for display on computing devices. Electronic content can also include application software developed for computing devices that is designed to perform one or more specific tasks at the computing device.

Electronic content development is the process for developing mobile and other electronic content for one or more mobile and other computing devices. During the development process, some development applications provide a "design view." A design view gives a developer a "What You See Is What You Get" ("WYSIWYG") user interface for editing electronic content being developed, where the electronic content displayed during editing is the same as or very similar to the final output electronic content.

Differences in the resolution, orientation, display screen dimensions, and operating system for various mobile and other computing devices can require customizing the electronic content for display on the differing computing devices. Display schemes have been used to consolidate modifications required for displaying the electronic content on different platforms. For example, an application developed for use on a smart phone using an Apple® iOS operating system and on a tablet computer using a Microsoft® Windows® operating system may include a display scheme or other code for automatically applying certain display or rendering attributes based on whether the electronic content is being used on the smart phone or tablet computer.

Developing and testing electronic content that is intended for use on differing devices presents various challenges. For example, during development, it has not been possible to adequately and efficiently observe or anticipate how the electronic content will appear and function differently on differing devices. To observe how the electronic content will appear and function on differing devices has required cumbersome and time-consuming developer actions. For example, a developer may compile an application on a development computing device, deploy it to each of several different computing devices, and observe the appearance and functionality of the application on each of those different devices. Doing so has generally required that the application be individually compiled and/or individually deployed for each of the multiple, different devices.

Having to individually compile and/or individually deploy an application for multiple devices presents at least two disadvantages. First, a developer is unable to observe the effects of a particular change to an application being developed at or near the time the change is made (i.e., in real time). As a consequence, to develop an application, a developer may need to spend significant amounts of time in an inefficient and error-prone development cycle that involves making changes, testing those changes, making more changes, testing those additional changes, etc. Second, having to individually compile and/or individually deploy an application to multiple devices increases the time and costs associated with developing electronic content.

One solution for these problems is to include one or more display areas for emulating a display at a development computing device of one or more particular computing devices. For instance, a design view may include one display area emulating the display of an application on a smart phone and another display area emulating the display of the application on the tablet computer.

While emulating the display of different platforms can approximate in real time how design changes will be rendered at each device, an emulated platform may not display electronic content with full fidelity, i.e., such that the content will not necessarily appear and/or function the same as it would when using electronic content on the actual computing device. For example, when a development computing device emulates the display of an application as it is expected to appear on a smart phone, the emulation may be inaccurate because of differences in pixel density between the display screen of the smart phone and the display screen of the development computing device. The scaling and size of different aspects of the application may be inaccurate. In addition, if electronic content being developed incorporates features requiring interaction with the display itself, such as touch screen functions, such features may be unavailable for testing on a development computing device emulating the display of another computing device supporting such features.

SUMMARY

One embodiment involves accessing, via a first computing device, electronic content being developed in a shared development environment, wherein the shared development environment comprises the first computing device and one or more other computing devices configured to provide access to the electronic content being developed in real time. The exemplary embodiment further involves receiving, at the first computing device, a modification to the electronic content that originated at one of the one or more other computing devices, providing, for display at the first computing device, the electronic content being developed with the modification, and executing, at the first computing device, the electronic content being developed with the modification.

Another exemplary embodiment involves accessing electronic content being developed in a shared development environment, wherein the shared development environment comprises the computing system and one or more other computing devices configured to provide access to the electronic content being developed in real time. The exemplary embodiment further involves modifying the electronic content being developed and providing access to the electronic content being developed with a modification in real time to the one or more other computing devices.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
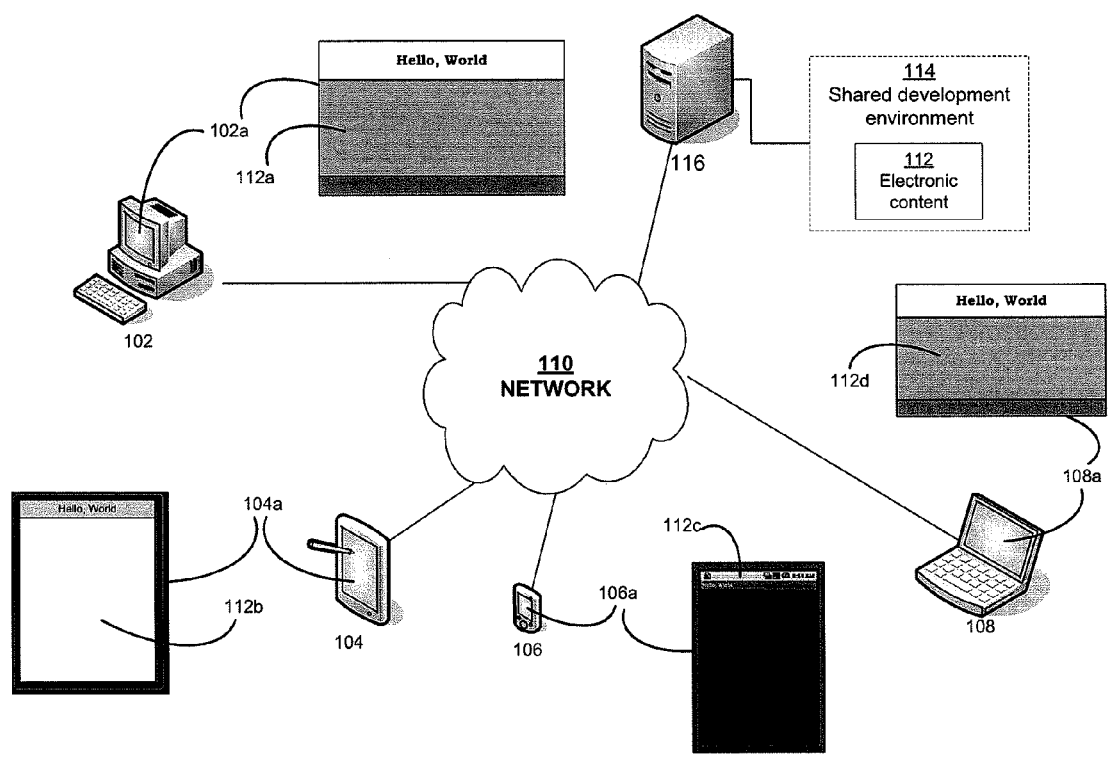
FIG. 1 is a network diagram illustrating multiple computing devices accessing electronic content in a shared development environment.

Computer-implemented systems and methods are disclosed for displaying and/or testing modifications to electronic content across multiple types of computing devices while the electronic content is being developed or tested. To introduce the subject matter presented herein, the following example illustrates an example of multi-device development that could be implemented using one or more techniques of certain embodiments presented herein. A developer may use a development application on a desktop computer to change a title displayed in electronic content he or she is developing from "MY SHORT TITLE" to "MY LONGER AND MORE DESCRIPTIVE TITLE," and desire to observe how the title will be displayed on each of several multiple different devices, such as a laptop, cell-phone, and tablet computer. As the developer makes the change on the desktop computer, the change may be provided to other devices.

For example, the developer may have a laptop, cell-phone, and tablet computer available, with each of these devices linked in a shared development environment with the desktop computer. As the developer makes the change on the desktop computer, the change is provided to and displayed on each of the laptop, cell-phone, and tablet computer. The developer may quickly recognize that the changed title does not fit well on the cell-phone and make an appropriate change. For example, the developer may shorten the title or specify a rule in the electronic content so that a shorter title will be used by cell phone devices displaying the content and the longer title will be used by all other devices. After making such an adjustment, the developer can again observe how the electronic content being developed has changed on each of the other devices, i.e., on the laptop, cell-phone, and tablet computer, to ensure that the electronic content has been modified as desired.

Electronic content being developed can include, for example, a mobile application with features for performing one or more tasks. During the design, development, and testing of the electronic content, a design view may be displayed simultaneously on multiple computing devices. The design view can, but need not, include a user interface for receiving input modifying the electronic content on some or all of those computing devices. The various computing devices may simultaneously access the electronic content in the design view through a shared development environment.

For example, electronic content may be an application being developed for use on a laptop computer, a tablet computer, and a smart phone. Each device may use a different operating system. For example, a laptop computer may use a Microsoft® Windows® operating system and a tablet computer and a smart phone may use Apple® iOS operating systems. The application can be developed to provide a custom user interface for each device that accounts for differences among the various devices in screen size, screen resolution, memory, processing capability, and the like.

Various system and method features can be used to modify electronic content being developed and make the modified electronic content available for access in real time at each of multiple computing device in a shared development environment. Allowing modifications of electronic content to be displayed in real time across multiple computing devices without having to individually compile and/or individually deploy the electronic content to each device can reduce the time involved in developing electronic content. Displaying electronic content in real time at each computing device, as opposed to displaying electronic content at a development computing device using one or more emulation modules, can also allow for more effective testing of the features of electronic content.

As used herein, the term "shared development environment" refers to a plurality of computing devices having shared access to electronic content in real time. The plurality of computing devices can include one or more development computing devices. A development computing device can modify some or all of the features of electronic content being developed. A development computing device can be, but is not limited to, a desktop computer or a laptop computer. The plurality of computing devices can, but need not, include a host computing device used as a center for distributing electronic content being developed to the other devices, i.e., such that modifications to the electronic content being developed on any of the devices are received by the host and distributed to all of the other computing devices in real time. A host computing device can thus be used to distribute and otherwise provide modifications made to the electronic content to the plurality of computing devices and thus throughout the shared development environment.

A shared development environment can include a cross-platform runtime environment for different computing devices to modify the electronic content being developed. One example of the cross-platform runtime environment is Adobe Integrated Runtime (Adobe® AIR®). A shared development environment can also include a development application installed at each computing device for providing and receiving input specifying modifications at each computing device. A development application at each computing device can also compile modified electronic content.

As used herein, the term "real time" refers to providing modifications to the electronic content for display and execution simultaneously or nearly simultaneously on all computing devices immediately after modifying the electronic content. Displaying content in real time can involve displaying modifications without compiling the electronic content at a development computing device. As used herein, "executing" the electronic content refers to receiving input to the electronic content and performing the functions of the electronic content.

Modifications to electronic content being developed may be displayed differently on each of several computing devices accessing the electronic content. The displayed differences may be a result, for example, of differences in rendering attributes of each of the computing devices. Displaying the electronic content differently can include rendering the electronic content using different page orientations on different devices. Rendering attributes can include the dimensions of the screen where the electronic content being developed is displayed, the shape of the display screen, the resolution of the display screen, and the operating system of the computing device. Furthermore, the electronic content may be an application that is executed differently on each type of computing device as a result of differences in the operating system, user interface, processing capability, or memory capability at each type of computing device. Executing or otherwise using the application differently at each type of computing device can comprise omitting certain application features from specific computing devices based on the operating system, user interface processing capability, or memory capability. For example, an application, when executed on a tablet computer, may include a touch screen user interface that is omitted when the application is executed on a laptop computer or desktop computer.

A development computing device may apply a display scheme customized to each type of computing device to the electronic content before the modified electronic content is provided for display. A display scheme can include code for changing how electronic content is rendered on each type of computing device based on one or more rendering attributes of each type of computing device. Rendering attributes may include the height and width of a display screen of the one or more other computing devices or the resolution of the display screen. For example, a display scheme can include code for rendering electronic content being developed using a portrait orientation on a smart phone and using a landscape orientation on a laptop or tablet computer.

Real-time distribution of modifications made during development of electronic content being developed may involve compiling or other processing at each computing device. For example, a modification to an application being developed may be distributed throughout a shared development environment as part of application source code, an un-compiled application, or otherwise in a form that requires processing at the computing devices prior to presentation. As a more specific example, an un-compiled application may be deployed to all computing devices in the environment that individually compile the application. To facilitate such device-specific compilation, each computing device may include memory embodying a local library containing one or more compiler modules for compiling the un-compiled application. Such compiler libraries and modules may differ from device to device. If a particular device's local library does not contain a compiler module necessary for compiling the application, the compiler module can be provided, for example, by a host computing device or otherwise obtained by the particular device.

In one embodiment, a host computing device is a server hosting a shared development environment. The server can authenticate requests for access to electronic content being developed originating from one or more computing devices. The server can also receive modifications of the electronic content from one or more of the other computing devices and provide those modifications to the other computing devices.

In one embodiment, a shared development environment may be implemented as a peer-to-peer shared development environment, thereby obviating the need for a server to authenticate requests for access to the shared development environment. In a peer-to-peer shared development environment, each peer computing device can connect to the shared development environment on a co-equal, ad hoc basis via a peering service. Each peer computing device connecting via the peering service can identify itself as associated with a common logical workgroup, where the logical workgroup is designated by a group identifier. The peering service can allow all peer computing devices associated with the logical workgroup to share co-equal access to electronic content stored in memory on one or more of the peer computing devices. Each peer computing device may also distribute modifications of the electronic content to other peer computing devices via multicast. A development computing device in a peer-to-peer shared development environment may store electronic content being developed in local memory rather than accessing the electronic content via a server.

Exemplary systems and methods also provide features for controlling editing capabilities of each computing device accessing electronic content being developed in a shared development environment. For example, in one embodiment, one or more development computing device in a shared development environment are configured with full editing capabilities and thus be able to modify all features of electronic content being developed, while other computing devices in the environment are configured to only display and execute the electronic content. Such other devices may be configured to provide limited or no capability to modify the electronic content. In another embodiment, multiple computing devices accessing electronic content being developed in a shared development environment may be configured as development computing devices with limited or full editing capability. A computing device may be configured with limited editing capability such that the computing device provides functionality for modifying only certain features of the electronic content.

The extent of each computing device's editing capability may be determined automatically based on each computing device's type and operating system. If a server hosts the shared development environment, each computing device's editing capability may also be determined based on a permission scheme enforced during authentication of the computing device. For example, if a computing device requests access from a server hosting a shared development environment using authentication information (such as a user name or MAC address) that is associated with limited editing capability, the server can restrict the computing device's editing capability accordingly.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating multiple computing devices accessing electronic content in a shared development environment. Computing device 102 is a desktop computer. Computing device 104 is a tablet computer. Computing device 106 is a smart phone. Computing device 108 is a laptop computer.

FIG. 1 also illustrates how electronic content 112 being developed is displayed differently on different computing devices. For example, display 102a of computing device 102 renders electronic content 112a using a landscape orientation, a white title bar with black text aligned with the center of the screen, and a grey display area. Display 104a of computing device 104 renders electronic content 112b using a portrait orientation, a light grey title bar with black text aligned with the center of the screen, and a white display area. Display 106a of computing device 104 renders electronic content 112c using a portrait orientation, a dark grey title bar with white text aligned at the left side of the screen, and a black display area. Display 108a, which uses the same display scheme as computing device 102, renders electronic content 112d using a landscape orientation, a white title bar with black text aligned with the center of the screen, and a grey display area.

Computing devices 102, 104, 106, 108 can access, via network 110, electronic content 112 being developed in a shared development environment 114. A shared development environment can include a cross-platform runtime environment for different computing devices to modify electronic content 112 being developed. A cross-platform runtime environment provides an abstraction layer between electronic content 112 being developed and operating system-level operations (e.g., memory allocation or disk access) of each computing device accessing the electronic content 112. One example of a cross-platform runtime environment is Adobe® AIR®.

A shared development environment can also include a development application installed at each computing device for providing and receiving input specifying modifications at each computing device. A development application can include one or more software modules for developing electronic content 112. For example, a development application can include software modules for editing source code of electronic content 112 being developed, for compiling the source code of electronic content 112 into object code used by a computing device 102, 104, 106, 108, and for debugging electronic content 112. A development application can also be used to develop electronic content 112 for multiple types of computing devices and multiple operating systems. One example of a development application is Adobe® Flash® Builder®.

While four computing devices 102, 104, 106, 108 are depicted in FIG. 1, any number of computing devices can access a shared development environment. The types of computing devices that can access a shared development environment is not limited to those depicted in FIG. 1, but rather can be any type of computing device capable of using electronic content.

In one embodiment, server system 116 can host a shared development environment, as depicted in FIG. 1. Server system 116 can authenticate requests for access to the shared development environment originating at computing devices 102, 104, 106, 108. Server system 116 can also provide modifications of electronic content 112 to computing devices 102, 104, 106, 108. Server system 116 can also control the editing capabilities of each computing device accessing electronic content being developed in a shared development environment. The editing capability of each computing device may allow modification of all features of the electronic content or may allow editing of only certain features.

For example, in one embodiment, computing devices 102 may be designated as a development computing device. The development computing device 102 is configured with full editing capability and thus able to modify all features of electronic content 112 being developed in shared development environment 114. Some of computing devices 104, 106, 108 may be configured as development computing devices with limited editing capability, while others may be configured only to display and execute the electronic content 112.

During authentication of each computing device's request to access shared development environment 114, server system 116 may automatically determine each computing device's editing capability based on the computing device's type and operating system. Server system 116 may also determine each computing device's editing capability based on a permission scheme associated with authentication information presented by each computing device when requesting access to shared development environment 114.

In another embodiment, shared development environment 114 may be implemented as a peer-to-peer shared development environment, thereby obviating the need for server system 116. In a peer-to-peer shared development environment 114, each of peer computing devices 102, 104, 106, 108 can connect to the shared development environment 114 on a co-equal, ad hoc basis via a peering service. Each peer computing device connecting via the peering service can identify itself as associated with a common logical workgroup, where the logical workgroup is designated by a group identifier. For example, a peering service may be used to create a workgroup designated as "Working Group A." Each peer computing device 102, 104, 106, 108 associated with Working Group A can share equal access to the electronic content 112 being developed upon joining Working Group A. An example of a peering service is Adobe® Cirrus®. The peering service can allow peer computing devices 102, 104, 106, 108 to share access to electronic content 112 stored in memory on one or more of the peer computing devices 102, 104, 106, 108. Each peer computing device may distribute modifications of the electronic content to one or more of the peer computing devices 102, 104, 106, 108 via multicast. A development computing device 102 may store electronic content 112 being developed in local memory rather than accessing the electronic content 112 via a server system 116.

Figure 2:
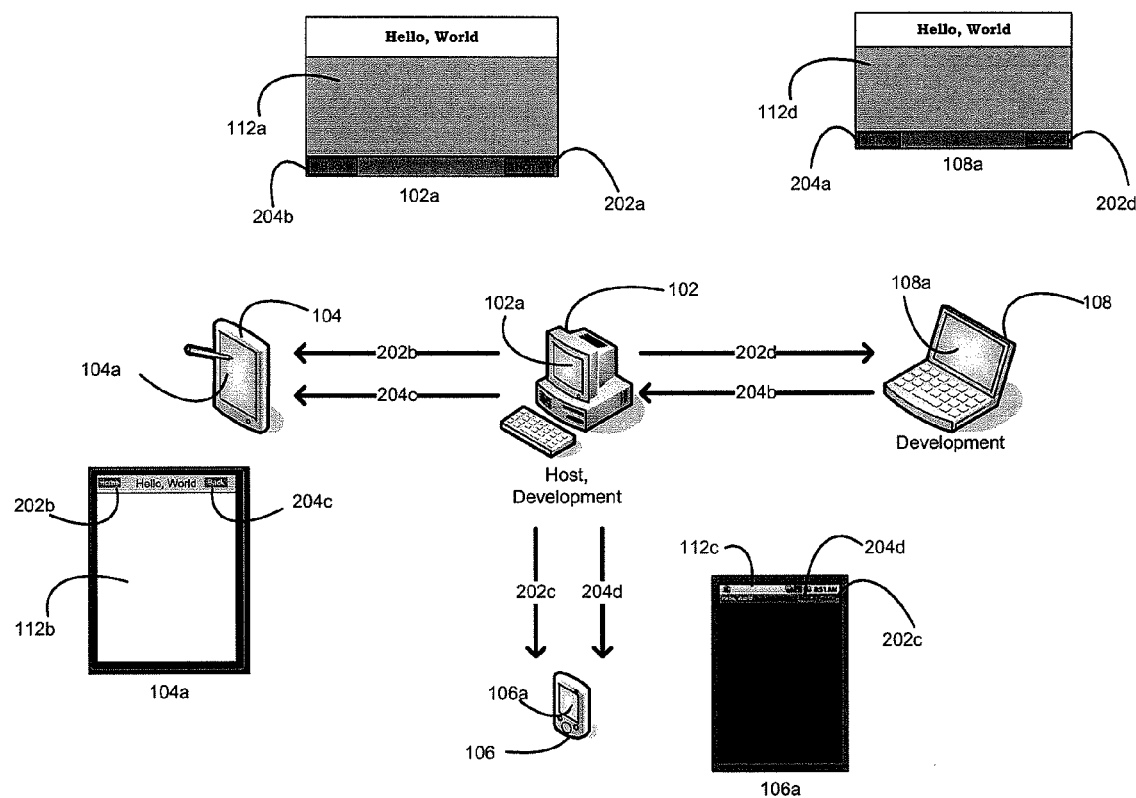
FIG. 2 is a network diagram illustrating an exemplary flow of communications between computing devices accessing electronic content in a shared development environment.

FIG. 2 is a network diagram illustrating an exemplary flow of communications between computing devices accessing electronic content in a shared development environment. As depicted in FIG. 2, computing device 102 is a desktop computer, computing device 104 is a tablet computer, computing device 106 is a smart phone, and computing device 108 is a laptop computer.

Computing devices 102 and 108 are development computing devices. Each development computing device 102, 108 can modify electronic content 112. For example, if electronic content 112 is an application, modifying the electronic content 112 can involve editing the source code of the application. Because computing devices 104, 106 are not development computing devices, computing devices 104, 106 can display and execute electronic content 112, but cannot provide any editing capability to modify electronic content 112.

As depicted in FIG. 2, computing device 102 is also a host computer. A host computer can provide modification 202 of electronic content 112 to each of the other computing devices 104, 106, 108. For example, providing modification 202 of electronic content 112 being developed to other computing devices can include a host computing device 102 providing modified source code for an application to each of computing devices 104, 106, 108.

FIG. 2 depicts an exemplary flow of communication for modifications 202a-d among the computing devices 102, 104, 106, 108. For example, at computing device 102, modification 202a can include adding a "Home" button to a user interface of electronic content 112. Computing device 102 can provide modifications 202b-d to computing devices 104, 106, 108. Each of the displays 102a, 104a, 106a, 108a can render the respective modifications 202b-d differently. Display 104a renders modification 202b as a "Home" button at the top left of the screen. Display 106a renders modification 202c as a "Home" button at the top right of the screen. Display 108a renders modifications 202d as a "Home" button at the bottom right of the screen, in an identical manner as display 102a renders modification 202a.

Because computing device 108 is a development computing device, computing device 108 can provide modification 204 to computing device 102. However, because computing device 108 is not a host computer, computing device 108 cannot provide modification 204 directly to computing devices 104, 106. Instead, computing device 108 must provide modification 204 to computing device 102. Computing device 102 can then provide modification 204 to computing devices 104, 106.

FIG. 2 depicts an exemplary flow of communication for modifications 204a-d among the computing devices 102, 104, 106, 108. For example, at computing device 104, modification 204a can include adding a "Back" button to a user interface of electronic content 112. Computing device 104 can provide modification 204b to computing device 102. Computing device 102 can then provide modifications 204c-d to computing devices 106, 108. Each of the displays 102a, 104a, 106a, and 108a can render the respective modifications 204a-d differently. Displays 102a and 108a render modifications 204a-b as a "Back" button at the bottom left of the screen. Display 104a renders modification 204c as a "Back" button at the top right of the screen. Display 106a renders modification 204d as a "Back" button at the top right of the screen to the left of the "Home" button.

Figure 3:
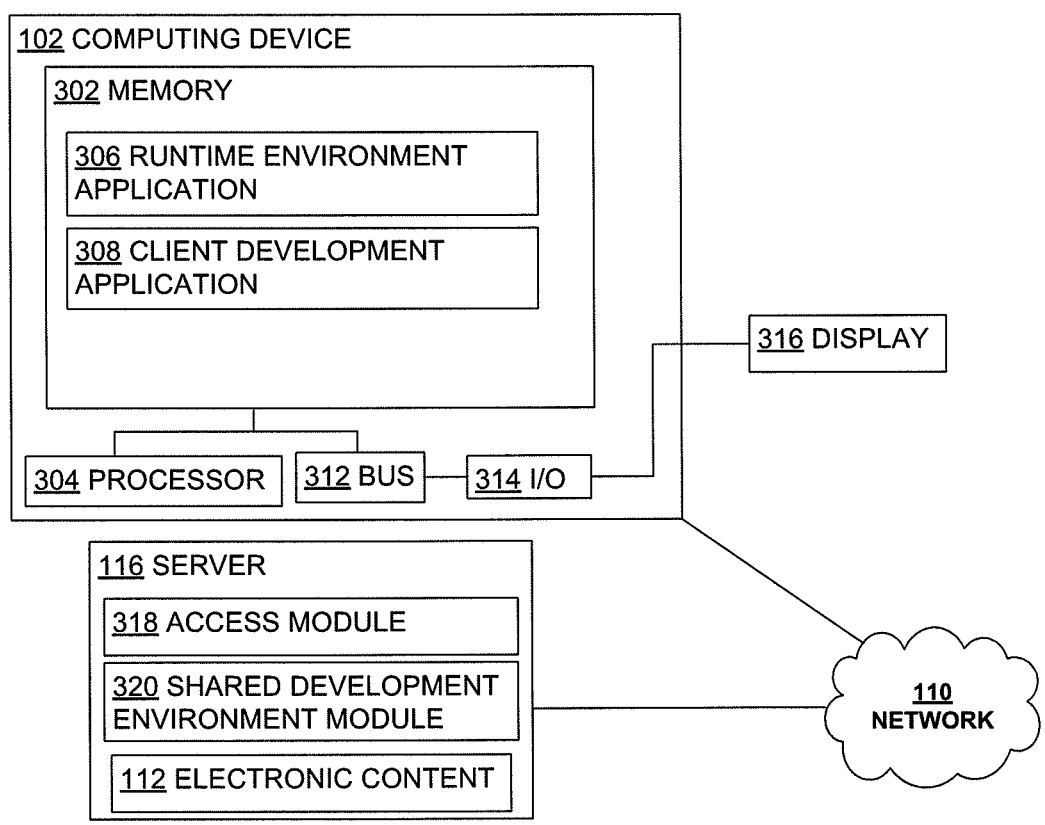
FIG. 3 is a block diagram depicting exemplary computing devices in an exemplary computing environment.

FIG. 3 is a block diagram depicting exemplary computing devices in an exemplary computing environment for implementing certain embodiments. While depicted with respect to computing device 102, the components described below may also be comprised in each of computing devices 104, 106, and 108.

The computing device 102 comprises a computer-readable medium such as a random access memory (RAM) 302 coupled to a processor 304 that executes computer-executable program instructions and/or accesses information stored in memory 302. Such a processor 304 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing device 102 may also comprise a number of external or internal devices such as a mouse, a CD-ROM, DVD, a keyboard, a display, audio speakers, one or more microphones, or any other input or output devices. For example, computing device 102 is shown with a display 316 and input/output interface (I/O) 314. A bus, such as bus 312, is also included in the computing devices 102.

FIG. 3 also illustrates runtime environment application 306 and client development application 308 comprised in memory 302. Runtime environment application 306 can be a client application for accessing the shared development environment 114. Runtime environment application 306 provides an abstraction layer between the electronic content 112 being developed and the operating system-level operations (e.g., memory allocation or disk access) of the computing device accessing the electronic content 112. One example of a cross-platform runtime environment is Adobe® AIR®.

Client development application 308 can be a software development tool for modifying and compiling the source code of electronic content 112. Client development application 308 can include several modules for developing electronic content 112. For example, client development application 308 can include modules for editing source code of the electronic content 112, for compiling the source code of electronic content 112 received from another computing device into object code used by computing device 102, and for debugging electronic content 112. One example of a development application is Adobe® Flash® Builder®.

FIG. 3 also depicts server system 116. Server system 116 includes access module 318, a shared development environment module 320, and electronic content 112. In one embodiment, server system 116 may be a single computing system. In another embodiment, server system 116 may be a virtual server implemented using a number of computing systems connected in a grid or cloud computing topology. In another embodiment, access module 318, shared development environment module 320, and electronic content 112 may be comprised in a computing device 102 configured to host shared development environment 114, thereby obviating the need for a separate server system 116.

Shared development environment module 320 can be used to host the shared development environment 114. Shared development environment module 320 can provide modifications of electronic content 112 to each of the other computing devices in shared development environment 114.

Access module 318 can receive and grant requests for access to the shared development environment 114. Access module 318 can authenticate requests for access based on appropriate authentication criteria, such as a user name and password or a MAC address associated with a computing device 102.

Electronic content 112, such as an application, executes or is otherwise used on the exemplary computing device 102. As is known to one of skill in the art, such electronic content 112 may be resident in any suitable computer-readable medium and execute on any suitable processor. In one embodiment, electronic content 112 can reside in memory at server system 116. In another embodiment, electronic content 112 can reside in memory at a development computing device in the shared development environment.

Figure 4:
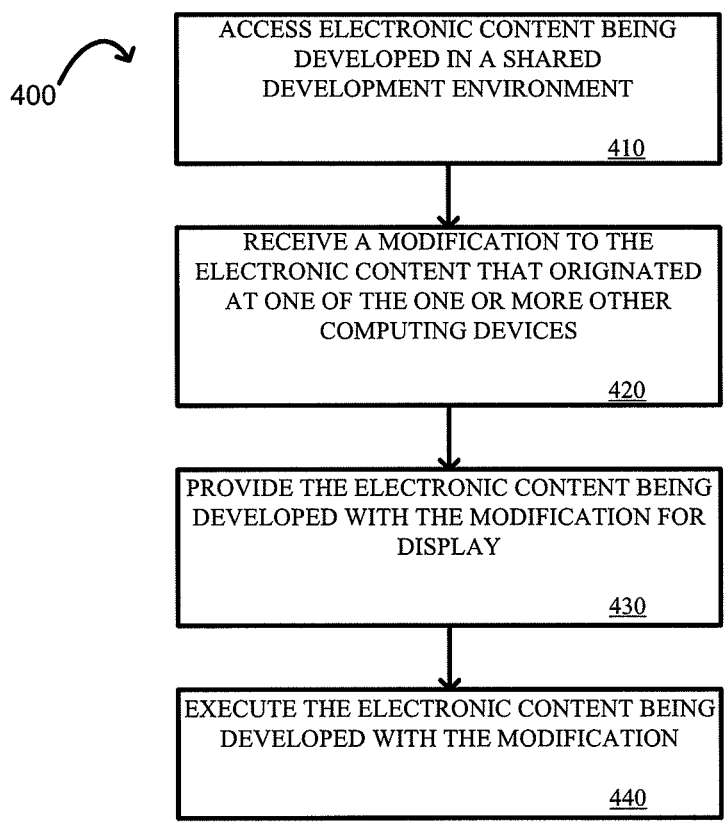
FIG. 4 is a flow chart illustrating an exemplary method for a computing device to receive modifications to electronic content being developed in real time.

FIG. 4 is a flow chart illustrating an exemplary method for a computing device to receive modifications to electronic content being developed in real time. The exemplary method 400 starts with accessing electronic content 112 being developed in shared development environment 114, as shown in block 410. A computing device 102 may execute block 410. In one embodiment, computing device 102 can request access to a shared development environment 114 hosted by server system 116. At server system 116, access module 318 can authenticate the request for access. After authenticating the request for access from computing device 102, shared development environment module 320 can provide computing device 102 with access to electronic content 112. In another embodiment, computing device 102 can access electronic content 112 residing in memory at a development computing device in the shared development environment 114.

The exemplary method 400 further involves receiving a modification to the electronic content 112 that originated at one of one or more other computing devices at block 420. A computing device 102 may execute block 420.

In one embodiment, electronic content 112 may comprise content that does not require compiling. For example, electronic content 112 may comprise an HTML or XML document that can be used by an application at a computing device 102.

In another embodiment, receiving a modification to electronic content 112 involves computing device 102 receiving an un-compiled application from a host computing device. The un-compiled application may comprise the source code embodying the modification to the application. Source code can include instructions to be executed by processor 304 and written in a computer programming language such as Javascript, C++, Perl, PHP, ActionScript, etc.

Computing device 102 can compile the un-compiled application for display and/or execution using client development application 308. Client development application 308 can include a compiler module for compiling the un-compiled application. A compiler module can include code for translating source code used by all of the computing devices into object code for use by the operating system of computing device 102. Therefore, client development applications at different computing devices may include different compiler modules, each compiler module specific to the operating system of the computing device.

If client development application 308 does not contain a compiler module capable of compiling the un-compiled application, the computing device 102 can request an updated compiler module from the server system 116. In one embodiment, the server system 116 can generate an updated compile module using shared development environment module 320 and provide the updated compiler module to computing device 102. In another embodiment, the server system 116 can request an updated compiler module from a development computing device.

The exemplary method 400 further involves, in block 430, displaying electronic content 112 being developed along with the modification. A computing device 102 may execute block 430. Computing device 102 may render the modified electronic content 112 for display after receiving the modification. In one embodiment, electronic content 112 may be displayed or used differently at a computing device 102 than on at least one of one or more other computing devices 104, 106, 108 in a shared development environment 114 as a result of differences in a display screen size, a display screen shape, or a display screen resolution. For example, a computing device 102 may include a display screen with a diagonal width of 20 inches and a resolution of 1600 pixels by 900 pixels. A computing device 106 may include a display screen with a diagonal width of four inches and a resolution of 960 pixels by 640 pixels. Accordingly, the computing device 106 may provide a simplified, low resolution display of electronic content 112 being developed as compared to computing device 102.

The exemplary method 400 further involves, in block 440, executing the electronic content 112 being developed with the modification. Executing the electronic content can include receiving input to the electronic content and performing the functions of the electronic content. A computing device 102 may execute block 440. Computing device 102 may execute the modified electronic content 112 after receiving the modification.

Electronic content 112 may be executed or otherwise used differently on computing device 102 than on at least one of one or more other computing devices 104, 106, 108 as a result of differences in operating system, user interface, processing capability, or memory capability between the computing devices. For example, the operating system of a computing device 104 may provide a touch-screen keyboard, while the operating systems of computing devices 106, 108 may only support a physical keyboard. Accordingly, electronic content 112, such as an application, may include a touch-screen keyboard when executed or otherwise used on computing device 104 but omit a touch-screen keyboard when executed on computing devices 106, 108.

Figure 5:
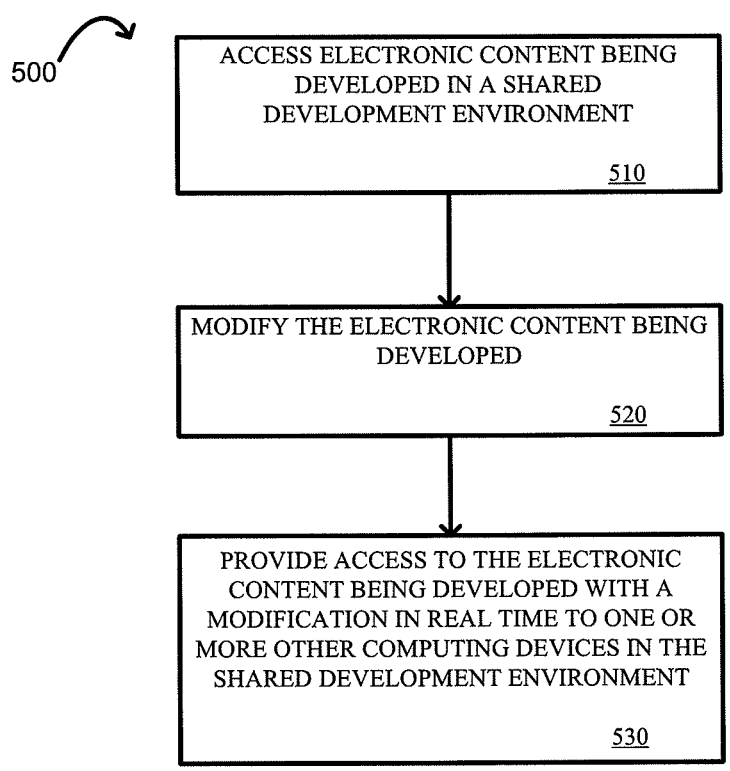
FIG. 5 is a flow chart illustrating an exemplary method for a computing system to modify electronic content being developed and provide the electronic content to other computing devices in real time.

FIG. 5 is a flow chart illustrating an exemplary method for a computing system to modify electronic content being developed and provide the electronic content to other computing devices in real time. The exemplary method 500 starts with accessing electronic content 112 being developed in shared development environment 114, as shown in block 510. A computing device 102 may execute block 510. In one embodiment, a computing device 102 may access, via network 110, electronic content 112 being developed that is stored on a server system 116. Computing device 102 can request access from server system 116 to a shared development environment 114 hosted by server system 116. Upon authentication of computing device 102 by server system 116, computing device 102 can access electronic content 112. In another embodiment, a computing device 102 may access electronic content 112 stored in memory 302. In another embodiment, access module 318 and shared development environment module 320 may be comprised in a computing device 102. Thus, computing device 102 can host a shared development environment 114, receive requests for access from computing devices 104, 106, and 108, and grant access to computing devices 104, 106, and 108.

The exemplary method 500 further involves, at block 520, modifying electronic content 112 being developed. A computing device 102 may execute block 520. In one embodiment, a computing device 102 may be configured as a development computing device providing an editing capability to modify electronic content 112. The extent of the editing capability comprises the sub-set of all features of electronic content 112 being developed that computing device 102 can modify. The editing capability may extend to all features of the electronic content 112 or may be limited to only certain features.

For example, in one embodiment, a computing device 102 may be configured as a development computing device providing full editing capability. Therefore, computing device 102 can modify all features of the electronic content 112. In another embodiment, a computing device 102 be configured as a development computing device with providing limited editing capability. Limited editing capability may involve allowing computing device 102 to modify a set of features of the electronic content that is a sub-set of all features of the electronic content.

In one embodiment, the extent of an editing capability of a computing device 102 may be determined based on the device type or operating system of the computing device 102. A computing device with greater memory or processing capability may be configured with full editing capability. For example, a computing device 102 that is a desktop computer may be configured with full editing capability, while a computing device 102 that is a smart phone may be configured with limited editing capability. In another embodiment, the extent of an editing capability of a computing device 102 may be determined based on one or more rendering attributes of the display screen of a computing device 102. The one or more rendering attributes can include a height and a width of a display screen of the computing device 102. The one or more rendering attributes can also include a resolution of a display screen of the computing device 102.

Shared development environment module 320 can be used to determine the extent of a computing device 102's editing capability. Shared development environment module 320 may include a software module for detecting the device type or rendering attributes of a computing device 102 accessing electronic content 112 being developed and limiting the extent of computing device 102's editing capability. For example, if shared development environment module 320 detects that a computing device 102 is a smart phone with low resolution, the computing device 102 may be limited to modifying features that can be rendered in low resolution.

Access module 318 can also be used to determine the extent of a computing device 102's editing capability. In one embodiment, a server system 116 may determine the editing capability of computing device 102 during computing device 102's request for access based on a pre-determined permissions scheme. When server system 116 uses access module 318 to allow computing system 102 to access shared development environment 114, access module 318 may determine whether computing system 102's request for access includes authentication information associated with a pre-determined permission scheme. For example, computing device 102 may be associated with a MAC address designated as having only limited editing capability. Therefore, when server system 116 authenticates computing device 102's request for access, server system 116 can limit the editing capability of computing device 102.

The exemplary method 500 further involves, at block 530, providing access to electronic content 112 being developed along with a modification in real time to one or more other computing devices in a shared development environment. A computing device 102 may execute block 530.

In one embodiment, a development computing device 102 can provide a modification of electronic content 112 to a host computing device in shared development environment 114. The host computing device can then provide the modification to one or more other computing devices in shared development environment 114.

In another embodiment, development computing device 102 can also be configured as a host computing device. Computing device 102 can therefore provide a modification of electronic content 112 directly to one or more other computing devices. Computing device 102 can provide access to the electronic content with the modification to any number of the other computing devices. For example, if a modification of electronic content 112 affects only one or more computing devices using a particular operating system, computing device 102 can select only those computing devices to receive access to the modification of electronic content 112.

Providing access to a modification of electronic content 112 being developed in real time to one or more other computing devices can involve providing a display scheme for displaying the electronic content 112 at each computing device. In one embodiment, a display scheme may be based on one or more rendering attributes of one or more other computing devices. One or more rendering attributes may comprise a height and a width of a display screen of the one or more other computing devices. For example, a display scheme may use a portrait orientation on a vertically-oriented display screen with a greater length than width and use a landscape orientation on a horizontally oriented display screen with a greater width than length. The display scheme may also position some features of an application's user interface to be closer together on a smaller display screen. The display scheme may also render certain features in a lower resolution for devices with a lower display screen resolution. One or more rendering attributes may also comprise a resolution of a display screen of the one or more other computing devices.

In another embodiment, a display scheme may be based on the operating system of a computing device 102. For example, if an operating system uses specific default fonts, a display scheme may instruct computing device 102 to render the electronic content 112 using that font.

In one embodiment, a development computing device 112 may provide the display scheme along with the modification. In another embodiment, a host computing device 102 may determine and provide a display scheme for each computing device accessing shared development environment 114.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
accessing, by a processor of a computing system, source code being developed in a shared development environment, wherein the shared development environment comprises the computing system and a plurality of computing devices configured to access the source code being developed in real time;
modifying, by the processor, the source code being developed to include a modification;
determining, by the processor, that a subset of computing devices from the plurality of computing devices are affected by the modification, wherein the subset of computing devices being affected by the modification comprises only those computing devices from the plurality of computing devices that will display output generated from executing the source code with the modification differently than output generated from executing the source code without the modification; and
providing, by the processor, access in real time to the source code being developed with the modification only to the subset of computing devices based on the subset of computing devices being affected by the modification.

2. The method of claim 1, further comprising:
hosting the shared development environment;
receiving a request for access to the shared development environment from each of the plurality of computing devices; and
based on determining that each of the plurality of computing devices is authorized to access the shared development environment, granting access to each computing device.

3. The method of claim 1, wherein providing access to the source code being developed with a modification in real time to the subset of computing devices further comprises providing a display scheme for the source code being developed.

4. The method of claim 3, wherein the subset of computing devices is determined and the display scheme is selected based on at least one rendering attribute of the subset of computing devices.

5. The method of claim 4, wherein the at least one rendering attribute comprises a respective height and a respective width of a respective display screen of each of the subset of computing devices.

6. The method of claim 4, wherein the at least one rendering attribute comprises a respective resolution of a respective display screen of each of the subset of computing devices.

7. The method of claim 3, wherein the subset of computing devices is determined and the display scheme is determined based on a respective operating system of each of the plurality of computing devices.

8. The method of claim 1, wherein modifying the source code comprises:
modifying a set of features of the source code; and
wherein the set of features is a sub-set of all features of the source code.

9. The method of claim 8, further comprising displaying output generated by executing the source code at a display screen, wherein the shared development environment determines the sub-set of all features of the source code included in the set of features based on at least one rendering attribute of the display screen.

10. The method of claim 8, wherein the shared development environment determines the sub-set of all features of the source code included in the set of features based on a predetermined permissions scheme for the plurality of computing devices.

11. A computing system comprising:
a processor; and
a non-transitory computer-readable medium communicatively coupled to the processor,
wherein the processor is configured for executing instructions stored in the non-transitory computer-readable medium and thereby performing operations comprising:
accessing source code being developed in a shared development environment, wherein the shared development environment comprises the computing system and a plurality of computing devices configured to access the source code being developed in real time,
modifying the source code being developed to include a modification,
determining that a subset of computing devices from the plurality of computing devices are affected by the modification, wherein the subset of computing devices being affected by the modification comprises only those computing devices from the plurality of computing devices that will display output generated from executing the source code with the modification differently than output generated from executing the source code without the modification, and
providing access in real time to the source code being developed with the modification only to the subset of computing devices based on the subset of computing devices being affected by the modification.

12. The system of claim 11, wherein the operations further comprise:
hosting the shared development environment;
receiving a request for access to the shared development environment from each of the plurality of computing devices; and
based on determining that each of the plurality of computing devices is authorized to access the shared development environment, granting access to each computing device.

13. The system of claim 11, wherein providing access to the source code being developed with a modification in real time to the subset of computing devices further comprises providing a display scheme for the source code being developed.

14. The system of claim 13, wherein the subset of computing devices is determined and the display scheme is selected based on at least one rendering attribute of the subset of computing devices, the at least one rendering attribute comprising at least one of (i) a respective height and a respective width of a respective display screen of each of the subset of computing devices and (ii) a respective resolution of the respective display screen.

15. The system of claim 13, wherein the subset of computing devices is determined and the display scheme is determined based on a respective operating system of each of the plurality of computing devices.

16. A non-transitory computer-readable medium storing program code executable by a computing system, the non-transitory computer-readable medium comprising
program code for accessing source code being developed in a shared development environment, wherein the shared development environment comprises the computing system and a plurality of computing devices configured to access the source code being developed in real time;
program code for modifying the source code being developed to include a modification;
program code for determining that a subset of computing devices from the plurality of computing devices are affected by the modification, wherein the subset of computing devices being affected by the modification comprises only those computing devices from the plurality of computing devices that will display output generated from executing the source code with the modification differently than output generated from executing the source code without the modification; and program code for providing access in real time to the source code being developed with the modification only to the subset of computing devices based on the subset of computing devices being affected by the modification.

17. The non-transitory computer-readable medium of claim 16, wherein the program code further comprises:

program code for hosting the shared development environment;

program code for receiving a request for access to the shared development environment from each of the plurality of computing devices; and program code for based on determining that each of the plurality of computing devices is authorized to access the shared development environment, granting access to each computing device.

18. The non-transitory computer-readable medium of claim 16, wherein the program code for providing access to the source code being developed with a modification in real time to the subset of computing devices further comprises program code for providing a display scheme for the source code being developed.

19. The non-transitory computer-readable medium of claim 18, wherein the subset of computing devices is determined and the display scheme is selected based on at least one rendering attribute of the subset of computing devices, the at least one rendering attribute comprising at least one of (i) a respective height and a respective width of a respective display screen of each of the subset of computing devices and (ii) a respective resolution of the respective display screen.

20. The non-transitory computer-readable medium of claim 18, wherein the subset of computing devices is determined and the display scheme is determined based on a respective operating system of each of the plurality of computing devices.

* * * * *